Oct. 5, 1965  J. B. JONES  3,209,447
TRANSDUCER COUPLING SYSTEM
Filed March 12, 1962  2 Sheets-Sheet 1
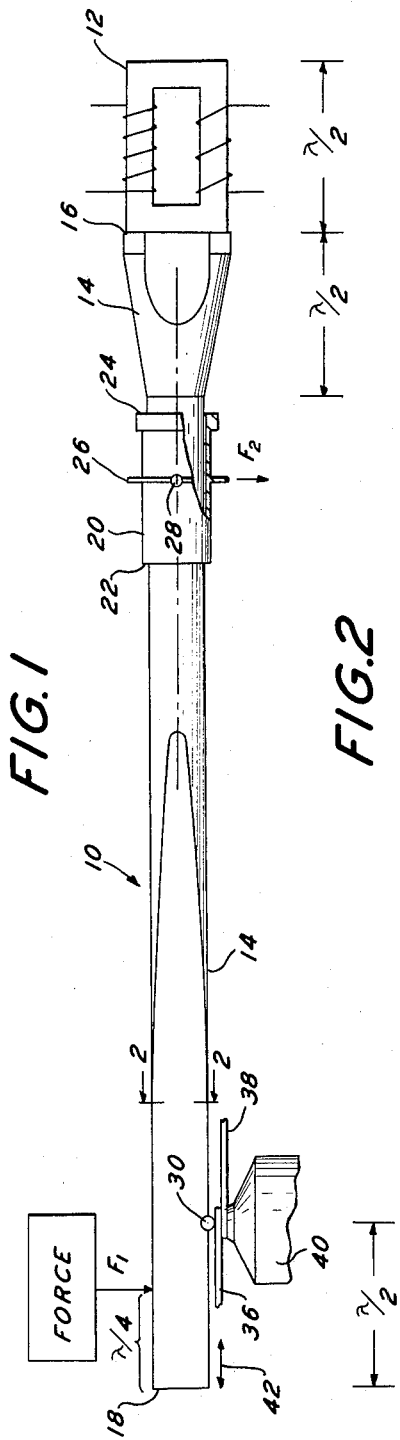
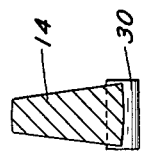
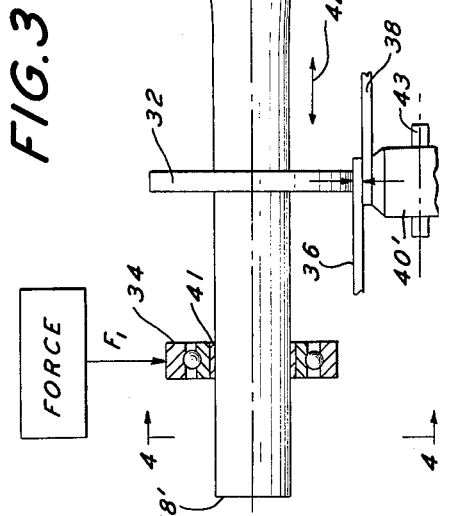
INVENTOR.
JAMES BYRON JONES
BY
Arthur H. Seidel
ATTORNEY Oct. 5, 1965
J. B. JONES
3,209,447
TRANSDUCER COUPLING SYSTEM
Filed March 12, 1962
2 Sheets-Sheet 2
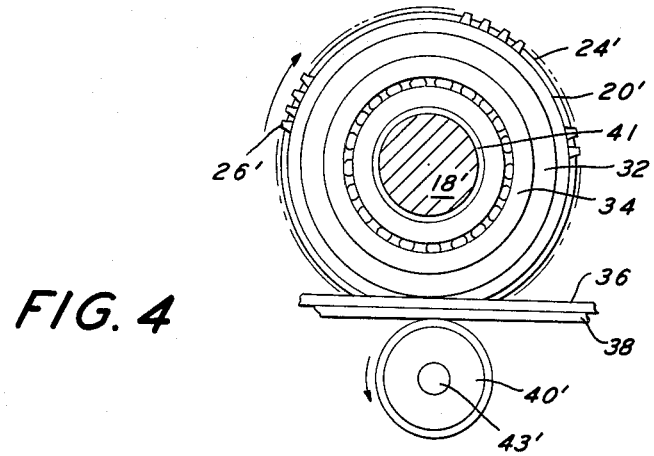
FIG. 4
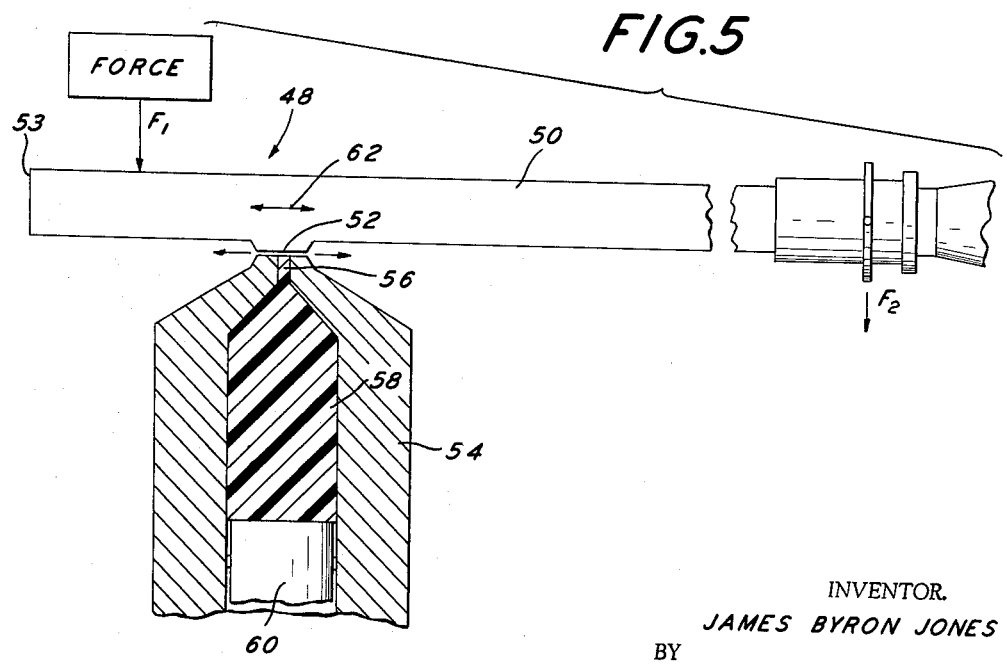
INVENTOR.
JAMES BYRON JONES
BY
*Arthur H. Seidel*
ATTORNEY

United States Patent Office 3,209,447
Patented Oct. 5, 1965

3,209,447
TRANSDUCER COUPLING SYSTEM
James Byron Jones, West Chester, Pa., assignor to Aeroprojects Incorporated, West Chester, Pa., a corporation of Pennsylvania
Filed Mar. 12, 1962, Ser. No. 178,800
15 Claims. (Cl. 29—470)

This invention relates to a transducer-coupling system for applying vibratory energy to a medium, and more particularly, to a transducer-coupling system for applying static forces in conjunction with dynamic shear stresses involving high intensity vibratory energy.

In U.S. Patents 2,946,119, 2,946,120 and 2,985,954 there is disclosed apparatus and method for welding together work-pieces by means of vibratory energy. In such patents, there is disclosed the concept of applying a force to the members to be welded, which force is in a direction and of a magnitude to hold the contacting to-be-welded faces of the members in intimate contact at the intended weld zone and to couple mechanical vibratory energy into said zone. These patents disclose that the aforesaid force may be applied at various locations associated with the transducer-coupling system acoustic design, which locations are generally between the transducer and the work area.

It has been discovered that the aforesaid force in some cases may be applied conveniently and with greater benefit at a location beyond the work area from the transducer, although still associated with acoustic design of the transducer-coupling system. This is especially true in a so-called lateral-drive transducer-coupling system as, for example, illustrated in FIGURE 8 of Patent 2,946,119. The force can by means of the present invention be applied beyond the work area from the transducer, if the acoustical coupler is suitably lengthened beyond the work-performing tip with the extension having a length of at least a single one-half wavelength. The force is thus applied at a true acoustical node location between the free end of the coupler and the work-performing tip. With the extension having a length of one-half wavelength, in a transducer-coupling system having conventional one-half wavelength dimensioning, the force will be applied one-quarter wavelength beyond the location where the vibratory energy is being utilized to perform work, which is also one-quarter wavelength from the free end of the coupler, i.e., equidistant (acoustically) between the work-performing tip and the free end of the coupler.

The design of a transducer-coupling system is complex, since one does not have great freedom with the dimensions of the system. The acoustic requirements at the work area involve considerations of vibratory amplitude and vibratory force characteristics at any resonant frequency, and these requirements ordinarily operate to the end of requiring specific cross-sections. Therefore, if a system is designed to meet the requirements involved to handle the static forces only, the cross section of the system is often unsatisfactory acoustically, and vice versa.

The present invention provides an energy delivery system which can be designed acoustically without undue compromise to accommodate the static forces essential to operation of the system. Thus, it virtually eliminates problems of bending softness productive of bounce and lack of control, which have been encountered with prior systems when, for example, high powers to weld heavy thicknesses are required. At the same time it provides an essentially force-insensitive array (e.g., one which is not productive of frequency shift of the system or loss of acoustical energy to attachments to the system) such as is requisite for quality vibratory welding and certain other vibratory applications.

It is an object of the present invention to provide a novel transducer-coupling system for introducing oscillatory shear stresses to a work area.

It is another object of the present invention to provide a novel transducer-coupling system for use where non-vibratory forces are to be exerted on a coupler laterally of its axis, i.e., in a plane approximately perpendicular to its axis.

It is yet another object of the present invention to provide a novel vibratory welding apparatus.

It is still another object of the present invention to provide a novel method for vibratory welding.

It is yet another object of the present invention to provide a novel apparatus and method for spot-type and seam-type vibratory welding.

It is an additional object to provide a novel apparatus and method for vibratory homogenizing.

Other objects will appear hereinafter.

For the purpose of illustrating the invention there is shown in the drawings forms which are presently preferred; it being understood, however, that this invention is not limited to the precise arrangements and instrumentalities shown.

FIGURE 1 is an elevational view of the transducer-coupling system of the present invention incorporated in a vibratory welding apparatus.

FIGURE 2 is a transverse sectional view taken along lines 2—2 of FIGURE 1.

FIGURE 3 is an elevational view of the transducer-coupling system of the present invention incorporated in a roller-seam vibratory welding apparatus.

FIGURE 4 is a view taken along lines 4—4 in FIGURE 3.

FIGURE 5 is an elevational view, partly in section, illustrating another use of the transducer-coupling system of the present invention.

Referring to the drawings in detail, wherein like numerals indicate like elements, there is shown in FIGURE 1 the transducer-coupling system of the present invention incorporated in a vibratory spot welding apparatus designated generally as 10.

The transducer-coupling system of the present invention comprises a transducer 12 axially jointed to the end 16 of the coupler 14, preferably with a metallurgical joint. The coupler 14 is preferably made of metal such as steel, monel, aluminum-bronze, beryllium-copper, etc. The coupler 14 is provided with an end 18 remote from the transducer 12. The over-all length of the coupler 14 from 16 to 18 is an even number of one-quarter wavelengths (i.e., an integral number of one-half wavelengths) in the material of construction and its geometry at the design frequency. The shortest possible acoustical length of the acoustical coupler 14 in accordance with the present invention is four one-quarter wavelengths (two one-half wavelengths). The shortest coupler 14 will have two one-quarter wavelengths between the end 16 and the work area and two one-quarter wavelengths between end 18 and the work area. As illustrated in FIGURE 1, the member 14 has a length of 14 one-quarter wavelengths (7 one-half wavelengths).

The coupler 14 is preferably supported by means of a force-insensitive mount 20. The force-insensitive mount 20 is often referred to as an Elmore mount and is illustrated in U.S. Patents 2,891,178, 2,891,179 and 2,891,180. Since the force-insensitive mount 20 is well known to those skilled in the art, it is considered that a brief description of the same will suffice for purposes of the present invention.

The force-insensitive mount 20 comprises a sleeve having a length which may be one-half wavelength according to the material and geometry of the sleeve at the design frequency. One end 22 of the sleeve is permanently joined to the coupler 14 while the other end 24 is free from securement. A flange 26 extends radially outwardly from the sleeve at a point which is one-quarter wavelength from the end 22 of the sleeve. Accordingly, a true acoustical node will develop at the flange 26 so that the transducer-coupling system may be force-insensitively hinge-supported by securing the flange 26 to a pivot 28, or may be otherwise supported.

The vibratory welding apparatus 10 comprises the transducer-coupling system described above and a work-contacting member or welding tip 30. The tip 30 is preferably metallurgically bonded to the coupler 14 at a point which is spaced from the free end 18 of the coupler 14 by a distance corresponding to one-half of an acoustical wavelength in the material and geometry of the coupling member at the design frequency. A force is applied to the coupler 14 at a point which is acoustically equidistant (i.e., at the one-quarter wave point) from the free end 18 and the tip 30. Thus, such force will be applied to the coupler at a true acoustical node.

As shown in FIGURE 3, the transducer-coupling system of the present invention may be a revolving body capable of being utilized in a seam welding apparatus designated generally as 10'. The apparatus 10' is identical with the apparatus 10 except as will be made clear hereinafter.

The elements of apparatus 10' are designed to rotate about the axis shown by the center line of FIGURE 3. The system 10' may be installed in a head to provide bearing supports and may include rotational drives, slip rings for the introduction of high frequency and polarizing electrical energies, etc., as disclosed in FIGURE 2 of U.S. Patent 2,946,120.

A work-contacting member 32, which may be designed to be either resonant or non-resonant, is metallurgically joined to the coupler 14' at a point spaced from the free end of 18' by a distance corresponding to one-half wavelength according to the material and geometry of the coupler 14' at the design frequency. A bearing 34, preferably an antifriction bearing, is provided on the coupler 14' between the end 18' and the work contacting member 32. The bearing 34 is preferably spaced from the coupler 14' by an acoustically isolating collar 41, preferably of a nonmetallic material. The bearing 34 is acoustically equidistant from the free end 18' and the member 32. Therefore, a force may be applied to the coupler 14' at a true acoustical node through this bearing.

The apparatus 10 and 10' are adapted to ultrasonically weld the metal members 36 and 38. The metal members 36 and 38 are disposed in overlapping contact at the intended weld zone. The metal members 36 and 38 are supported by a non-compliant anvil 40 or 40' at the intended weld zone. Anvil 40' is a roller anvil adapted to rotate about an axis that is parallel to the axis of coupler 14'. The anvil 40' is provided with a central axial hole through which a support shaft 43 extends. The shaft 43 supports anvil 40' for rotary movement. The provision of a rotatably mounted anvil 40' facilitates relative movement of the metal members 36 and 38 with respect to the coupler 14'.

The work contacting members 30 and 32 (in FIGURES 1 and 3 respectively) engage the metal member 36 at the intended weld zone so that vibratory energy may be delivered to the metal members 36 and 38 in a direction which is perpendicular to the direction of the applied force and parallel to the interface of the metal members 36 and 38 as illustrated by the double-headed arrow 42.

In FIGURES 1 and 3 the invention has been illustrated and described with a single one-half wavelength extension of the coupler members 14 and 14' beyond the work area. However, it will be appreciated by those skilled in the art that the extension may comprise additional one-half wavelengths, as may be expedient. In that case, the force may be applied at any nodal location along such elongated extension, such as one-quarter wavelength from the work area or at any odd multiple of one-quarter wavelength from the work area.

While, with a sufficiently long coupler extension, the force may be applied at an integral odd multiple of one-quarter wavelength beyond the work-performing tip, the length of the extension and the application of force are preferably as illustrated in the drawings and discussed above. When the extension is too long and a force is applied at a point which is too far beyond the work area, problems will be encountered in work clearance, bending deformation, etc.

A work contacting member 32 (illustrated in FIGURE 3) of the resonant type is disclosed in U.S. patent application Serial No. 747,254 filed on July 8, 1958, now Patent No. 3,107,792, in the names of William C. Elmore and Carmine F. DePrisco and entitled "Vibratory Device." This type of tip can be used for spot-type, overlapping-spot-seam type or roller-seam-type vibratory welding; e.g., if it is not made to roll, it will make spot-type welds. It will be appreciated by those skilled in the art that other work-contacting tips may be used in connection with the transducer-coupling system of the present invention for delivering shear-type vibration (vibration-induced shear stresses) to a work area or working medium.

It will be appreciated that the transducer-coupling system of the present invention is capable of being utilized in arrays which are more versatile than those proposed heretofore. For example, efficiently applying a static force to a lateral-drive-type coupler of the prior art is difficult when the coupler has a substantial physical length, such as a length of three or four feet from transducer to work area. The transducer-coupling system of the present invention does not present this difficulty, and can therefore be used in various applications requiring the transducer to be remote from the work area for such purposes as protecting it from heat, radiation, chemical fumes and other deleterious environments.

While the force insensitive mounts 20 and 20' are useful in most instances, they may be omitted under circumstances where efficiency and stability are not of great importance.

While the introduction of "shear-type" vibration to a work area is of particular utility in connection with vibratory welding, it will be appreciated that the present invention may be used in other applications involving "shear-type" vibration. For example, the present invention may be utilized in the application of vibratory energy to solids and liquids.

Another application of the transducer-coupling system of the present invention is illustrated in FIGURE 5 and designated generally as 48. The apparatus 48 includes a coupler 50 connected to a transducer as illustrated in FIGURE 1. The coupler 50 is provided with a work performing tip 52 spaced from the end 53 by a distance corresponding to one-half of an acoustical wavelength in the material and geometry of the coupler 50 at the design frequency. A static force is applied to the coupler 50 at a location which is acoustically equidistant between the work performing tip 52 and the end 53, i.e., at one-quarter wavelength point which is a true acoustical node location.

The work performing tip 52 is provided with a planar reaction surface juxtaposed to the orifice 56. The spacing of the reaction surface on the work performing tip 52 from the orifice 56 may be as small as 0.00001 inch. Fluid or fluidized material 58 within the container 54 is pushed by plunger 60 (or screw-type feed or other convenient means) through orifice 56 under pressure. The amount of pressure depends upon the properties of the material and the magnitude of clearance by which the juxtaposed work face 52 is spaced from the orifice 56.

The material 58 passes through orifice 56 and contacts the area of vibration of the work performing tip 52, thereby issuing annularly around the periphery of the orifice 56 as shown by the arrows adjacent the space between the work performing tip 52 and the orifice 56. The issuance of material 58 will cover a full 360 degree arc. The transducer coupled to the coupler 50 causes the tip 52 to vibrate in the direction of arrow 62.

It is well known to the plastics and elastomer art that the mixing of pigments to obtain a fine and uniform disperson is accomplished in heavy and large machinery such as Banbury mixers which sometimes require hours of operation to achieve the proper degree of dispersion. The apparatus illustrated in FIGURE 5 will cause the material 58 to be issued in the form of a finely divided mixed uniform and sometimes further comminuted dispersion. The orifice 56 need not be circular, but may be any cross section; thus, the orifice 56 may have a rectangular cross section with its longest sides extending in a direction perpendicular to the plane of the drawing.

When the transducer-coupling system of the present invention is utilized in a welding apparatus, for example, as shown in FIGURES 1-4, the amount of forces $F_1$ and $F_2$ should be sufficient to hold the workpieces to be welded in firm contact at the intended weld interface. The clamping force may thus be varied over a wide range. In a preferred embodiment, the maximum clamping force need not produce a deformation of more than about ten percent and may not produce any appreciable deformation at all. By deformation is meant the loss in thickness of the weldment at the center of the weld zone divided by the aggregate thickness of the workpieces prior to welding, with the result multiplied by 100 to obtain percentage. The conditions under which welding is to take place have been generally developed as indicated in the above-mentioned patents and need not be described in detail.

As illustrated, the transducer 12 is of the magnetostrictive type and consists of a stack of metal laminations, such as laminations of nickel, or well known alloys such as nickel-cobalt, iron-cobalt-vanadium, iron-aluminum, etc., properly dimensioned to insure axial resonance with the frequency of the alternating current applied thereto, so as to cause it to increase or decrease in length according to its coefficient of magnetostriction.

In place of the aforesaid metallic magnetostrictive materials, the transducer 12 may comprise almost any material which has good physical properties and which will change its physical dimensions under the influence of an electric potential. Thus, the transducer 12 may comprise an electrostrictive material such as barium titanate, lead zirconate titanate, etc., or sophisticated sandwich assemblies of wafers made of such materials. The magnetostrictive materials have a preferred operating range at frequencies below 75,000 cycles per second. Ceramic transducer assemblies comprising sandwiches can be built to operate in about the same frequency range as or higher than the magnetostrictive materials, and they have several times the energy conversion efficiency of a nickel stack. For example, a nickel stack may have an over-all efficiency of 18-30% whereas a properly designed transducer assembly comprising ceramic washers can have an over-all efficiency of as high as about 90%.

The present invention is directed to a novel apparatus and method for providing a non-fusion weld between contacting members made of metal, plastic, etc. Means such as $F_1$ are provided for impelling a work performing tip such as tip 30 or 32 against an outer face of one of the metal members and holding the to-be-welded faces of the members being welded in intimate contact. The impelling means is coupled to the force-applying member 14 or 14′ at a node between a free end of said member and said tip.

Means such as transducer 12 are provided for vibrating the tip at a frequency of between about 59 and 300,000 cycles per second. The tip is caused to vibrate in a path substantially parallel to the interface of the members being welded. Sufficient vibratory energy is delivered by the tip so the members 36 and 38 are welded together by a non-fusion weld.

The present invention may be embodied in other specific forms without departing from the spirit or essential attributes thereof and, accordingly, reference should be made to the appended claims, rather than to the foregoing specification as indicating the scope of the invention.

I claim:

1. Apparatus comprising a vibration generating means, a vibratory energy coupler having one end axially connected to said vibration generating means, said coupler having a length corresponding to an integral number of one-half wavelengths according to the properties and geometry of said coupler, a work performing tip on said coupler intermediate the ends thereof and located at a point spaced from the other end of said coupler by a distance corresponding to an integral number of one-half wavelengths according to the properties and geometry of said coupler, and means for applying a static force to said coupler at a node of vibratory energy in said coupler, said node being spaced an odd whole number of one-quarter wavelengths from said tip, at a point between said tip and said other end of said coupler.

2. Apparatus comprising a continuous wave vibration generating means, a vibration-transmitting member coupled to said vibration generating means so that vibratory energy may be transmitted by said member in an axial direction thereof, said member having a length corresponding to an integral number of one-half wavelengths according to the properties and geometry of said member, a work performing tip connected to said member at a point spaced from the free end of said member by as distance corresponding to one-half wavelength according to the properties of said member, and means for applying a static force to said member at a node of vibratory energy in said member, said node being located between said tip and said free end of said member, said node being spaced an odd number of one-quarter wavelengths from said free end.

3. Apparatus comprising a continuous wave vibration generating means, a vibration-transmitting coupler having one end axially connected to said vibration generating means, said coupler having a length corresponding to an integral number of one-half wavelengths according to the properties and geometry of said coupler, a work performing tip connected to said coupler at a point spaced from the other end of said coupler by a distance corresponding to one-half wavelength according to the properties of said coupler, and means associated with said coupler for applying a static force to said coupler at a node of vibratory energy in said coupler between said other end of said coupler and said tip, said node being spaced an odd whole number of one-quarter wave lengths from said tip.

4. Apparatus in accordance with claim 2 including a nozzle having a discharge orifice disposed closely adjacent to said work performing tip so that material issuing from said nozzle through said orifice proceeds between said work performing tip and said nozzle in a direction generally radially outwardly with respect to said orifice, whereby said material will be intimately mixed into a dispersion.

5. Apparatus in accordance with claim 2 including an anvil for supporting metal members in abutting intimate contact at an intended weld zone with said work-performing tip against an outer face of one of said metal members to couple mechanical vibratory energy into the intended weld zone, with said vibration generating means being capable of furnishing sufficient power so that the mechanical vibration delivered by said work performing tip delivered in a direction substantially perpendicular to the direction of the applied force being at a sufficient energy level to weld the metal members together.

6. Apparatus for non-fusion welding contacting metal members together comprising a force-applying member having a length corresponding to an integral number of one-half wavelengths according to the properties and geometry of said member, means for impelling a tip secured to said member and spaced from a free end of said member by a distance corresponding to an integral number of one-half wavelengths against an outer face of one of said contacting metal members with a force in a direction and of a magnitude to hold the to-be-welded faces of the metal members in intimate contact at the intended weld zone and to couple mechanical vibratory energy into the intended weld zone, said impelling means being coupled to said force-applying member at a node between said free end of said force-applying member and said tip, said node being spaced an odd whole number of one-quarter wavelengths from said free end, and means for vibrating said tip at a frequency of between about 59 and 300,000 cycles per second in a path substantially parallel to the interface of the metal members being welded while such metal members are maintained in intimate engagement by contact between said tip and one of said members, with said vibrating means furnishing sufficient power so that the mechanical vibration delivered by said end portion in said path is at a sufficient energy level to weld the metal members together.

7. Apparatus comprising a vibration generating means, one end of a coupler being axially coupled to said vibration generating means, said coupler having a length corresponding to an integral number of one-half wavelengths according to the properties and geometry of said coupler, a work performing tip connected to said coupled intermediate the ends of said coupler and located at a point spaced from the other end of said coupler by a distance corresponding to at least one-half wavelength according to the properties of said coupler, a rotatable bearing on said coupler at a node between said other end and said tip, said node being spaced an odd whole number of one-quarter wavelengths from said other end, and means for applying a static force to said coupler through said bearing.

8. Apparatus in accordance with claim 7 wherein said tip is a resonant disc lying in a plane generally perpendicular to the longitudinal axis of said coupler, with said coupler being metallurgically joined to a central portion of said disc, with the outer periphery of said disc being positioned at an anti-node whereby mechanical vibratory energy may be delivered from the periphery of said disc.

9. Apparatus in accordance with claim 7 including a means for rotating said coupler and said disc about their longitudinal axes.

10. A method of applying a static force and vibratory energy to a work area comprising the steps of generating vibratory energy, providing a coupler having a length corresponding to a whole number multiple of one-half wavelengths according to the properties and geometry of said coupler and having a node spaced an odd whole number multiple of one-quarter wavelength from a free end of said coupler, transmitting said vibratory energy through the coupler to a work performing tip secured to said coupler intermediate its ends and at a location spaced from the free end of said coupler by a distance corresponding to a whole number multiple of one-half wavelength of vibratory energy according to the properties and geometry of said coupler, providing said tip on said coupler at a location so that said node is between said free end and said tip, and applying a static force to said coupler at said node in a direction generally perpendicular to the longitudinal axis of said coupler.

11. A method in accordance with claim 10 wherein the static force is applied to the coupler through a rotary bearing on said coupler at said node.

12. A method in accordance with claim 10 including juxtaposing a nozzle orifice to said tip, forcing material through said orifice against said tip, whereby an intimate mixture of uniformly dispersed particles will be issued from the space between said tip and said orifice.

13. A method for welding metal members together which method comprises holding contacting to-be-welded faces of the metal members together, applying a force to the metal members in a direction and of a magnitude to hold the contacting to-be-welded faces of the metal members in intimate contact at the intended weld zone and to couple mechanical vibratory energy into said zone, providing a vibrating element having a length corresponding to a whole number multiple of one-half wavelength according to the properties and geometry of said element, and introducing through said vibrating element having a tip contacting one of the to-be-welded metal members adjacent the weld zone mechanical vibration having a frequency of between about 59 and 300,000 cycles per second, said tip being spaced from a free end of said element by a distance corresponding to a whole number multiple of one-half wavelength according to the properties and geometry of said element, said force being applied to said element at a node between the free end of said element and said tip, said node being spaced from said free end of said element by a distance corresponding to an odd whole number multiple of one-quarter wavelength said mechanical vibration comprising a vibration component in a direction substantially parallel to the interface of metal members, and with such component being of an energy level sufficient to weld the metal members to each other.

14. A method in accordance with claim 13 including the steps of rotating said element and said tip while applying said force to said element through a rotatable bearing, whereby said tip joins said metal members with a seam weld.

15. Apparatus in accordance with claim 6 including an anvil which is non-compliant at the applied frequency, said anvil being adapted to support the metal members at the intended weld zone, and said anvil being mounted for rotation about an axis substantially parallel to the longitudinal axis of said force-applying member.

References Cited by the Examiner

UNITED STATES PATENTS

| | | | |
|---|---|---|---|
| 2,855,244 | 10/58 | Camp | 239—102 |
| 2,891,178 | 6/59 | Elmore | 310—26 |
| 2,891,179 | 6/59 | Elmore | 310—26 |
| 2,908,443 | 10/59 | Fouengel et al. | 239—102 |
| 2,985,954 | 5/61 | Jones et al. | 29—470 |
| 3,002,270 | 10/61 | De Prisco | 29—470 |

JOHN F. CAMPBELL, *Primary Examiner.*